(12) United States Patent
Dutheil

(10) Patent No.: US 9,267,608 B2
(45) Date of Patent: Feb. 23, 2016

(54) VALVE WITH A DELAYED CLOSING

(75) Inventor: Daniel Dutheil, Meshers (FR)

(73) Assignee: LES ROBINETS PRESTO, Montrouge (FR)

(*) Notice: Subject to any disclaimer, the term of this patent is extended or adjusted under 35 U.S.C. 154(b) by 473 days.

(21) Appl. No.: 13/637,425

(22) PCT Filed: Jan. 27, 2011

(86) PCT No.: PCT/FR2011/000037
§ 371 (c)(1),
(2), (4) Date: Feb. 11, 2013

(87) PCT Pub. No.: WO2011/117477
PCT Pub. Date: Sep. 29, 2011

(65) Prior Publication Data
US 2013/0126765 A1 May 23, 2013

(30) Foreign Application Priority Data

Mar. 26, 2010 (FR) ...................................... 10 01205

(51) Int. Cl.
*F16K 21/06* (2006.01)
*F16K 21/10* (2006.01)

(52) U.S. Cl.
CPC ................. *F16K 21/06* (2013.01); *F16K 21/10* (2013.01)

(58) Field of Classification Search
CPC .................................. F16K 21/06; F16K 21/10
USPC ......................... 251/35, 36, 39, 47, 48, 50–55
See application file for complete search history.

(56) References Cited

U.S. PATENT DOCUMENTS

| 2,181,581 | A | * | 11/1939 | Fraser | 137/244 |
| 2,635,621 | A | * | 4/1953 | Hansen | 137/209 |
| 2,710,736 | A | * | 6/1955 | Miller | 251/51 |
| 3,065,948 | A | * | 11/1962 | Nolan | 251/52 |
| 4,676,477 | A | * | 6/1987 | Strangfeld | 251/15 |
| 2009/0242819 | A1 | * | 10/2009 | Gao et al. | 251/323 |
| 2010/0163764 | A1 | * | 7/2010 | Collins et al. | 251/58 |

FOREIGN PATENT DOCUMENTS

| EP | 0 312 750 A2 | 4/1989 |
| EP | 0 928 918 A1 | 7/1999 |
| FR | 475 960 | 6/1915 |
| FR | 2 406 145 | 5/1979 |
| FR | 2 492 952 | 4/1982 |
| FR | 2 509 007 | 1/1983 |

* cited by examiner

*Primary Examiner* — Kevin Murphy
*Assistant Examiner* — Daphne M Barry
(74) *Attorney, Agent, or Firm* — Renner, Kenner, Greive, Bobak, Taylor & Weber

(57) ABSTRACT

Delayed valve of the type comprising a water entrance (2), a water exit (3), a plunger (6) supporting a shutter (5) and comprising a tubular tail (8) passing through the seat (4) in a sealed manner and comprising, at least, an opening (9) through which water can penetrate when the shutter is moved away from its seat and an exit opening (8*a*), characterized in that the raising of the shutter is controlled by the pressing down of a pressing button (10) the internal end of which is conformed to obturate the exit opening (8*a*) of the tail (8), said pressing button being submitted to the action of a counter spring (11).

7 Claims, 4 Drawing Sheets

VALVE WITH A DELAYED CLOSING

The present invention relates to improvements to delayed closing valves, of the type of those whose pressing of a pressing button defines the raising of the shutter, the flowing of water and simultaneously the evacuation of a delayed chamber in which a plunger comprising said shutter is moving, the filling of said chamber being performed through a calibrated opening allowing delaying the moving of the shutter pushed back into its seat by a spring.

If the user maintains the pushing button down, water flows and the delaying of the closing is prevented.

This drawback is very sensitive in a shower installation where the valve is controlled by a "priming valve", having a very simple structure and comprising a shutter and a pushing button that allow communication between the delaying chamber of the main valve and the outside free air.

In French patent 2492942, there is recited a valve in which the time of maintaining of the pressing down of the pressing button has no action on the delaying. Such a valve is particularly well adapted to being used as a primer valve in a shower installation.

Experience has shown that the making of such a valve is complicated.

In European patent 0928918, there is recited a valve whose opening cannot be obtained but by releasing the pressing button.

This valve is characterized essentially by the fact that the shutter comprises a tubular tail through which water flows when the shutter is moved away from its seat during the action on the usual pressing button, said tail being obturated by a elastically deformable membrane interposed between the end of said tail and said pressing button.

This device has proved efficient, but however it appeared that the making of the membrane is delicate and that the membrane is sensitive to aging.

Experience has also shown that this valve present problems concerning its assembling.

Of the know way, the shutter comprises a body having an entrance and an exit for water disposed each on either side of the seat, and a tubular tail passing through said seat in a sealed manner, characterized in that said tail can be obturated by the internal end of a pressing button during its pressing down.

Other features will come from the description that follows, made in relation to the appended drawings, that are given only as examples, in which.

Figure 1:
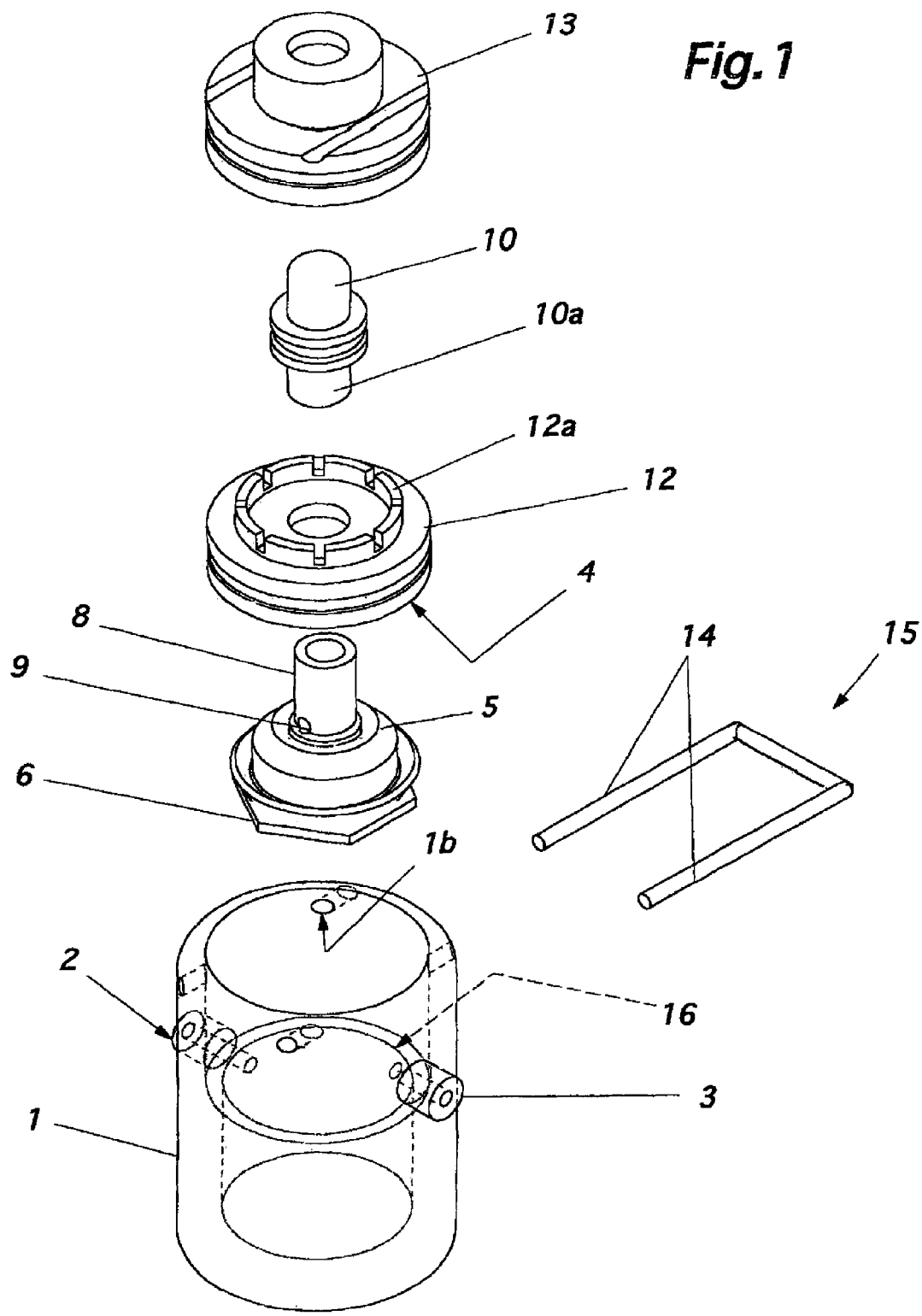
FIG. 1 is a fragmented perspective view showing the parts composing the valve of the invention.

The valve comprises a body 1, a water entrance 2 and a water exit 3, disposed, each on one side and the other of a seat 4 that is normally obturated by a shutter 5 supported by a plunger 6 delimitating with said body a delaying chamber 7. The plunger 6 is submitted to the action of a spring, not represented because this is well known in the technical field, interposed between its end 6a and the bottom 1a of the body.

Of known fashion, the plunger 6 comprises a tubular tail 8, having at least an opening 9 allowing water to penetrate in said tail to be, after that, evacuated through the exit opening 3.

According to the invention, the opening of the valve, which implies the moving of the plunger supporting the shutter along arrow F1, is made by a pressing button 10 whose internal end 10a is conformed to obturate the end 8a of the tail 8.

Figure 2:
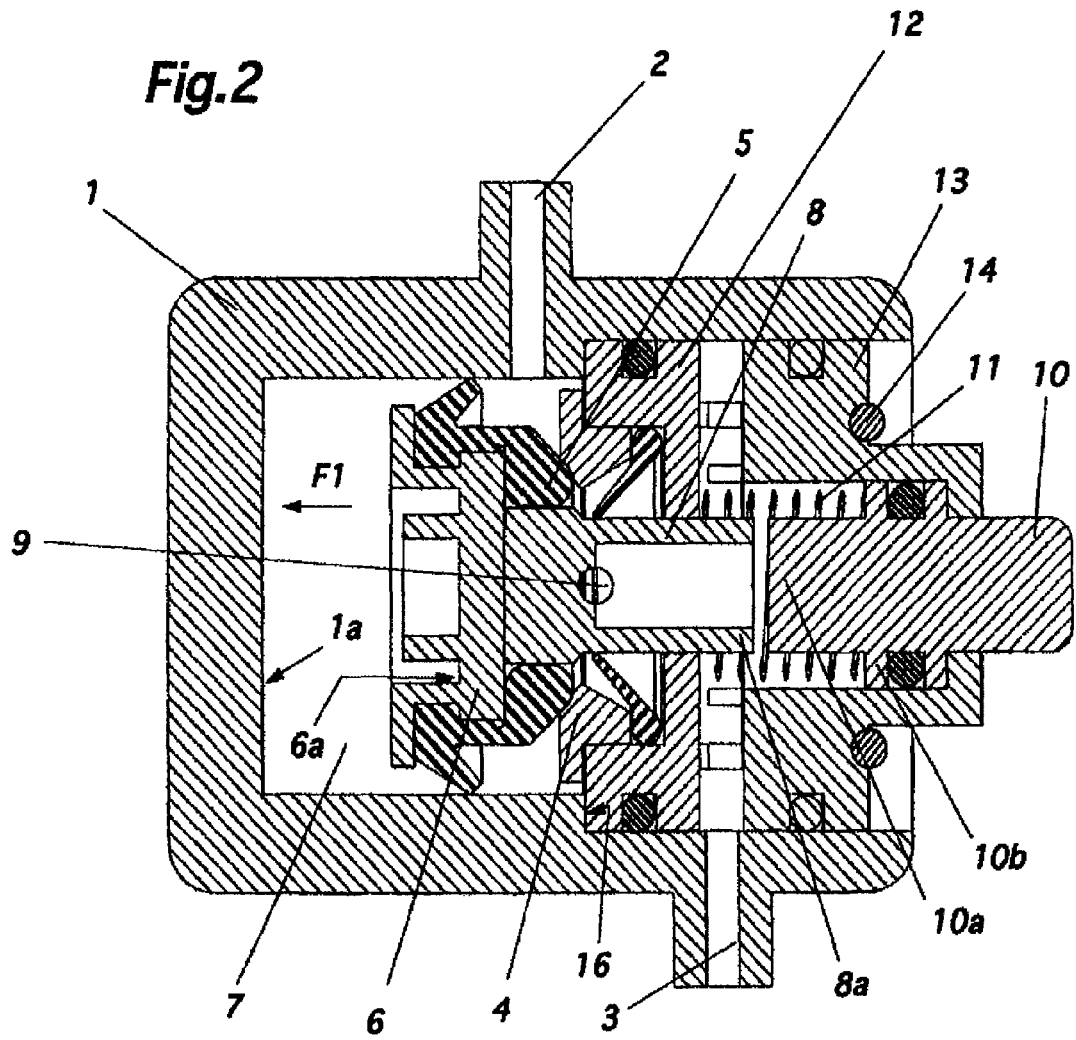
FIG. 2 is a longitudinal cross section view of the valve, the moving parts being represented in the position they take at rest (valve closed)

As it can be inferred from FIG. 2, by pressing down the pressing button 10, the plunger 6 is pushed back by the tail 8, and then the shutter 5 is being moved from its seat 4.

Water coming from entrance 2 can penetrate into the tail but cannot reach the exit 3 and flow, since the end of the said tail is totally obturated by the internal end of the pressing button.

This state of fact will keep being as long as an action will be maintained on the pressing button.

Figure 3:
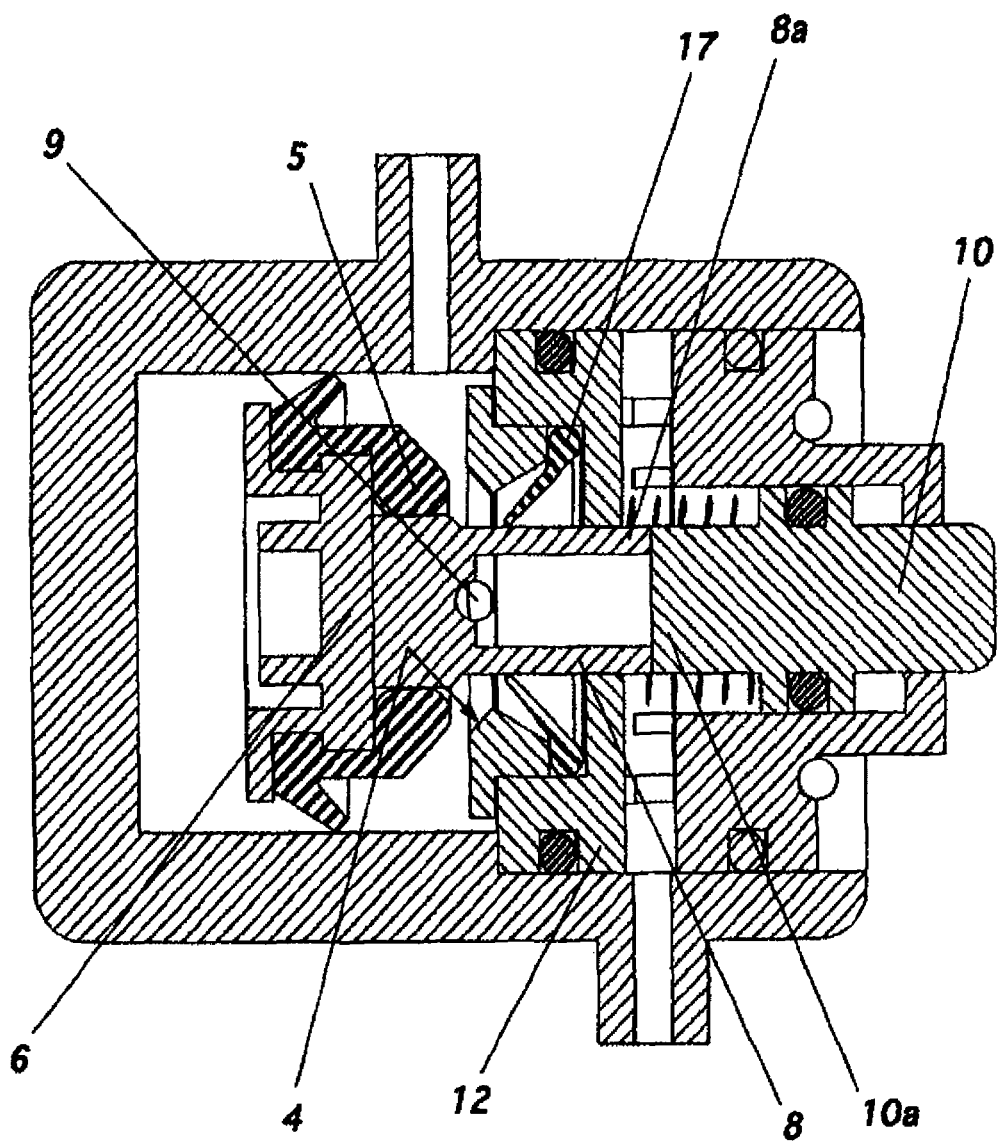
FIG. 3 is a view analogous to the view of FIG. 2, showing the position of the moving parts during pressing down of the pressing button.

As it can be inferred from FIG. 3, by pressing down the pressing button 10, the plunger 6 is pushed back by the tail 8, and then the shutter 5 is being moved from its seat 4.

Figure 4:
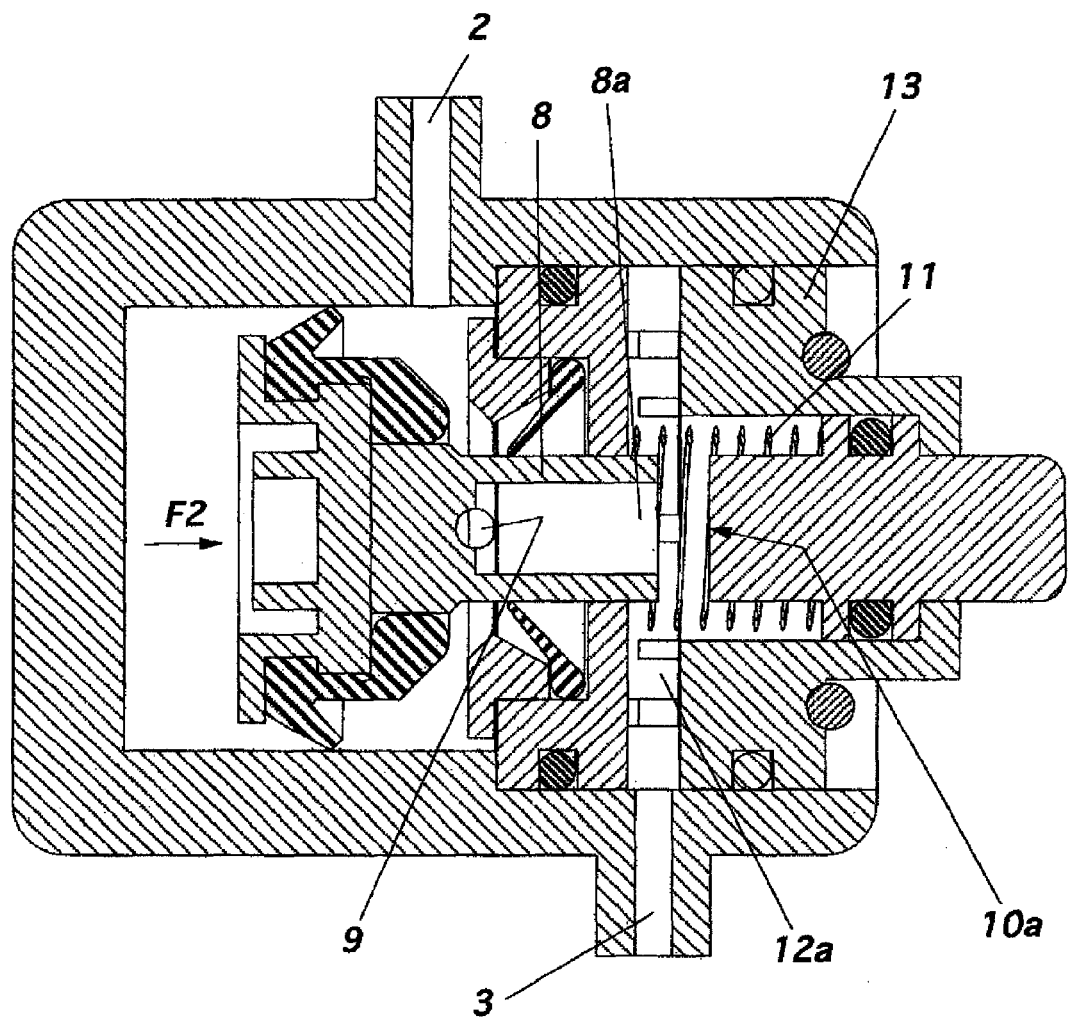
FIG. 4 is a view analogous to the view of FIG. 2, the moving parts being represented in the opening position of the valve.

By releasing the pressing button 10, the latter is pushed back by the spring 11, de-masking the end 8a of the tail 8, by having the openings 2 and 3 communicating with each other and by allowing, simultaneously, the plunger 6 to move along the arrow F2, as per the usual technique (FIG. 4). Water penetrates into chamber 7 through, for example, a small notch made at the periphery of the skirt of the shutter. This device is recited in European patent 0928918.

It can be inferred from the above explanations that such a valve is particularly well adapted to constitute or a priming device of a shower installation.

In such a case, the opening entrance 2 communicates with the discharging opening of the main valve and the delay period is determined to allow emptying of the delaying chamber of the main valve.

In general, the parts that are making the valve have been studied to allow an easy assembling, without the help of tools.

The plunger, the seat and its supporting organ 12 and the pressing button 10 are maintained in the body 1 by a covering cap 13, engaged in said body 1, also forming the guiding organ of the pressing button 10.

The whole is maintained by a spindle passing through the body 1, by holes 1b and against which the cap 13 bears under the action of the spring 11.

As shown on the drawings, there is used two spindles 14, forming, each, the arm of a clamp 15.

The penetration of the organ 12, supporting the shutter 4, into the body 1 is imitated by a shoulder 16. The organ 12 and the cap 13 have the same diameter, and therefore, the same gaskets may be used for making the sealing with the body 11.

The organ 12 comprises a lengthening piece 12a, against which the cap 13 bears, having diametrical slots allowing water coming from said tail 8 to reach the exit 3 when the moving parts are in the position shown on FIG. 4.

The shutter 4 and the organ 12 are forming a functional assembly made of two parts assembled together, for example by clipsage, to allow the mounting of the gasket 17, allowing the tail 8 to pass through this assembly in a sealed manner.

The invention claimed is:

1. Delayed valve of the type comprising a water entrance, a water exit, a plunger supporting a shutter and comprising a tubular tail passing through a seat in a sealed manner and comprising a first opening through which water can penetrate from said water entrance when the shutter is moved away from the seat and a second exit opening, wherein the raising of the shutter is controlled by the pressing down of a pressing button, said pressing button being submitted to the action of a return spring, wherein said second exit opening is facing said pressing button, said second exit opening comprises an outer edge and said pressing button comprises an inner face facing said second exit opening, and wherein, when said pressing button is pressed down, said inner face is in direct contact with said second exit opening outer edge, so that said second exit opening is obturated and water cannot flow between said water entrance and said water exit.

2. The valve of claim 1, characterized in that said plunger and its tail and said shutter and said pressing button are maintained in a body by a covering cap engaged into said body.

3. The valve of claim 2, characterized in that said cap is guiding said pressing button and is maintained by at least one spindle passing through said body.

4. The valve of claim 3, characterized in that the return spring is used to maintain a supporting organ of the seat against a shoulder of the body.

5. The valve of claim 2, characterized in that the return spring is used to maintain a supporting organ of the seat against a shoulder of the body.

6. The valve of claim 1, characterized in that the return spring is used to maintain a supporting organ of the seat against a shoulder of the body.

7. A delayed valve of the type comprising a water entrance, a water exit, a plunger supporting a shutter and comprising a tubular tail passing through a seat in a sealed manner and comprising a first opening through which water can penetrate from said water entrance when the shutter is moved away from the seat and a second exit opening, wherein the raising of the shutter is controlled by the pressing down of a pressing button, said pressing button being submitted to the actin of a return spring, wherein said second exit opening is facing said pressing button, said second exit opening comprises an outer edge and said pressing button comprises an inner face facing said second exit opening, wherein, when said pressing button is pressed down, said inner face is in direct contact with said second exit opening outer edge, so that said second exit opening is obturated and water cannot flow between said water entrance and said water exit, and wherein said pressing button is submitted to the action of a counter spring and said shutter is received in a delaying chamber, and wherein when said pressing button is released, said counter spring pushes back said pressing button inner face away from said exit opening outer edge and allows water to pass through said first opening and said second exit opening from said water entrance to said water exit as well as from said water entrance into said delaying chamber, the filling of said delaying chamber lowering back said shutter into said seat so as to close the valve after a delay.

* * * * *